United States Patent
Brosnan et al.

(10) Patent No.: US 11,810,168 B2
(45) Date of Patent: Nov. 7, 2023

(54) AUDITING MOBILE TRANSACTIONS BASED ON SYMBOL CUES AND TRANSACTION DATA

(71) Applicant: Toshiba Global Commerce Solutions Holdings Corporation, Tokyo (JP)

(72) Inventors: Susan W. Brosnan, Raleigh, NC (US); Kenneth Hammer, Durham, NC (US); Stacy Arrington, Durham, NC (US); Patricia Hogan, Durham, NC (US); Michael Leclair, Durham, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 94 days.

(21) Appl. No.: 17/221,375

(22) Filed: Apr. 2, 2021

(65) Prior Publication Data
US 2022/0318868 A1 Oct. 6, 2022

(51) Int. Cl.
*G06Q 30/00* (2023.01)
*G06Q 30/0601* (2023.01)
*G06Q 20/18* (2012.01)

(52) U.S. Cl.
CPC ......... *G06Q 30/0609* (2013.01); *G06Q 20/18* (2013.01)

(58) Field of Classification Search
CPC .......................... G06Q 30/0609; G06Q 20/18
See application file for complete search history.

(56) References Cited

U.S. PATENT DOCUMENTS

| | | | | |
|---|---|---|---|---|
| 5,397,882 A | * | 3/1995 | Van Solt | G07G 1/0054 235/383 |
| 6,672,506 B2 | * | 1/2004 | Swartz | G07G 3/003 235/383 |
| 7,631,808 B2 | * | 12/2009 | Kundu | G07F 19/207 235/383 |
| 7,634,448 B1 | * | 12/2009 | Ramachandran | G07G 1/0045 705/64 |
| 8,104,680 B2 | * | 1/2012 | Kundu | G06Q 20/00 235/383 |
| 8,290,814 B2 | * | 10/2012 | Walter | G07G 1/0018 705/16 |
| 8,396,758 B2 | * | 3/2013 | Paradise | G06Q 30/0224 705/26.1 |
| 10,074,016 B2 | * | 9/2018 | Migdal | G07G 1/0072 |

(Continued)

OTHER PUBLICATIONS

"Stores make push in scan and go technology," by Anna D'Innocenzio, the Medicine Hat News (Medicine Hat, Alta), Feb. 24, 2018 (Year: 2018).*

*Primary Examiner* — Anne M Georgalas
(74) *Attorney, Agent, or Firm* — Patterson + Sheridan, LLP

(57) ABSTRACT

The present disclosure provides techniques for monitoring transaction data. A first symbol is a symbol is assigned, at a first point in time, to a user device, where, when a user of the user device inputs an item, the user device outputs the symbol. The symbol is then detected, via one or more image capture devices, at one or more moments in time, and a number of times that the symbol was detected is determined. At a second point in time subsequent to the first point in time, a number of items associated with the user is determined. An audit of the uses is initiated based on determining that a difference between the number of times and the number of items exceeds a threshold maximum difference.

20 Claims, 9 Drawing Sheets

(56) References Cited

U.S. PATENT DOCUMENTS

| | | | |
|---|---|---|---|
| 10,387,817 B2* | 8/2019 | Kellstrand | G06Q 10/0635 |
| 10,496,946 B2* | 12/2019 | Geffert | G06Q 20/18 |
| 10,878,670 B1* | 12/2020 | Cho | G08B 13/19613 |
| 2003/0197782 A1* | 10/2003 | Ashe | H04N 7/18 |
| | | | 348/150 |
| 2012/0158529 A1* | 6/2012 | Edwards | G06Q 20/20 |
| | | | 705/16 |
| 2012/0188377 A1* | 7/2012 | Kundu | G07G 3/003 |
| | | | 348/150 |
| 2015/0269549 A1* | 9/2015 | Herring | G06Q 20/203 |
| | | | 705/18 |
| 2015/0347997 A1* | 12/2015 | Delott | G06Q 20/208 |
| | | | 705/22 |
| 2016/0364659 A1* | 12/2016 | Bergdale | G06Q 20/3274 |

\* cited by examiner

AUDITING MOBILE TRANSACTIONS BASED ON SYMBOL CUES AND TRANSACTION DATA

BACKGROUND

The present disclosure relates to auditing transaction data, and more specifically, to using unique symbol cues to automatically monitor transactions.

Self-service retail environments (e.g., self-checkout) has become increasingly common in a wide variety of establishments. Typically, these systems are designed to be largely autonomous, needing minimal oversight from employees. Additionally, there has been increasing effort to further reduce friction in retail environments, such as by automatically identifying items selected by the customer (e.g., placed in a cart or basket) and allowing the customer to check out automatically without stopping at a designated check out area. For example, the system may use cameras or other sensors to identify objects being selected, and the user may automatically be charged accordingly when they leave the premises.

However, such systems are inherently inaccurate in a wide variety of common environments or contexts. There is a need for more robust systems that automatically monitor such transactions.

SUMMARY

According to one embodiment of the present disclosure, a method is provided. The method includes assigning, at a first point in time, a symbol to a user device, wherein, when a user of the user device inputs an item, the user device outputs the symbol; detecting, via one or more image capture devices, the symbol at one or more moments in time; determining a number of times that the symbol was detected; determining at a second point in time subsequent to the first point in time, a number of items associated with the user; and initiating an audit of the user based on determining that a difference between the number of times and the number of items exceeds a threshold maximum difference.

According to a second embodiment of the present disclosure, a computer-readable storage medium is provided. The computer-readable storage medium contains computer program code that, when executed by operation of one or more computer processors, performs an operation. The operation includes assigning, at a first point in time, a symbol to a user device, wherein, when a user of the user device inputs an item, the user device outputs the symbol; detecting, via one or more image capture devices, the symbol at one or more moments in time; determining a number of times that the symbol was detected; determining at a second point in time subsequent to the first point in time, a number of items associated with the user; and initiating an audit of the user based on determining that a difference between the number of times and the number of items exceeds a threshold maximum difference.

According to a third embodiment of the present disclosure, a system is provided. The system includes one or more computer processors, and a memory containing a program which, when executed by the one or more computer processors, performs an operation. The operation includes assigning, at a first point in time, a symbol to a user device, wherein, when a user of the user device inputs an item, the user device outputs the symbol; detecting, via one or more image capture devices, the symbol at one or more moments in time; determining a number of times that the symbol was detected; determining at a second point in time subsequent to the first point in time, a number of items associated with the user; and initiating an audit of the user based on determining that a difference between the number of times and the number of items exceeds a threshold maximum difference.

DETAILED DESCRIPTION

Embodiments of the present disclosure provide techniques to automatically monitor and audit transactions based on symbols or other cues in the environment. In some embodiments, users can use mobile applications (e.g., on a smart phone) to scan items they wish to purchase in a retail space. In one embodiment, each time the user scans an item, a unique symbol is automatically output by the user's device. In embodiments, the symbol may include, for example, visual cues (e.g., a pattern and/or color output on the screen of the device), audio cues (e.g., a sound played by the device), and the like. In embodiments, the system can monitor the physical environment to detect such cues (e.g., using cameras or other sensors).

By correlating the detected symbols with other transaction data (e.g., the records of scans made by each user in the space), the system can intelligently monitor the ongoing transactions and ensure they remain accurate and frictionless. Advantageously, such embodiments do not require positive identification of the user (e.g., using facial recognition), which allows accurate monitoring while protecting the personal privacy of each user.

In various embodiments, this correlation may include comparing the number of detected cues to the number of items in the user's receptacle (e.g., cart, bag, or basket), comparing the number of cues to the number of items indicated in the transaction records, evaluating the context of each detected cue and comparing it to the transaction data at that time (e.g., to determine whether the user scanned one item but added a different item to their cart), evaluating the context each time a user adds an item to their cart (e.g., to determine whether the user neglected to scan an item), and the like.

In some embodiments, based on such analysis, the system can intelligently determine whether to initiate an audit of the transaction. Such an audit may include, for example, alerting one or more employees, pausing the transaction until verification can be made, and the like.

Figure 1:
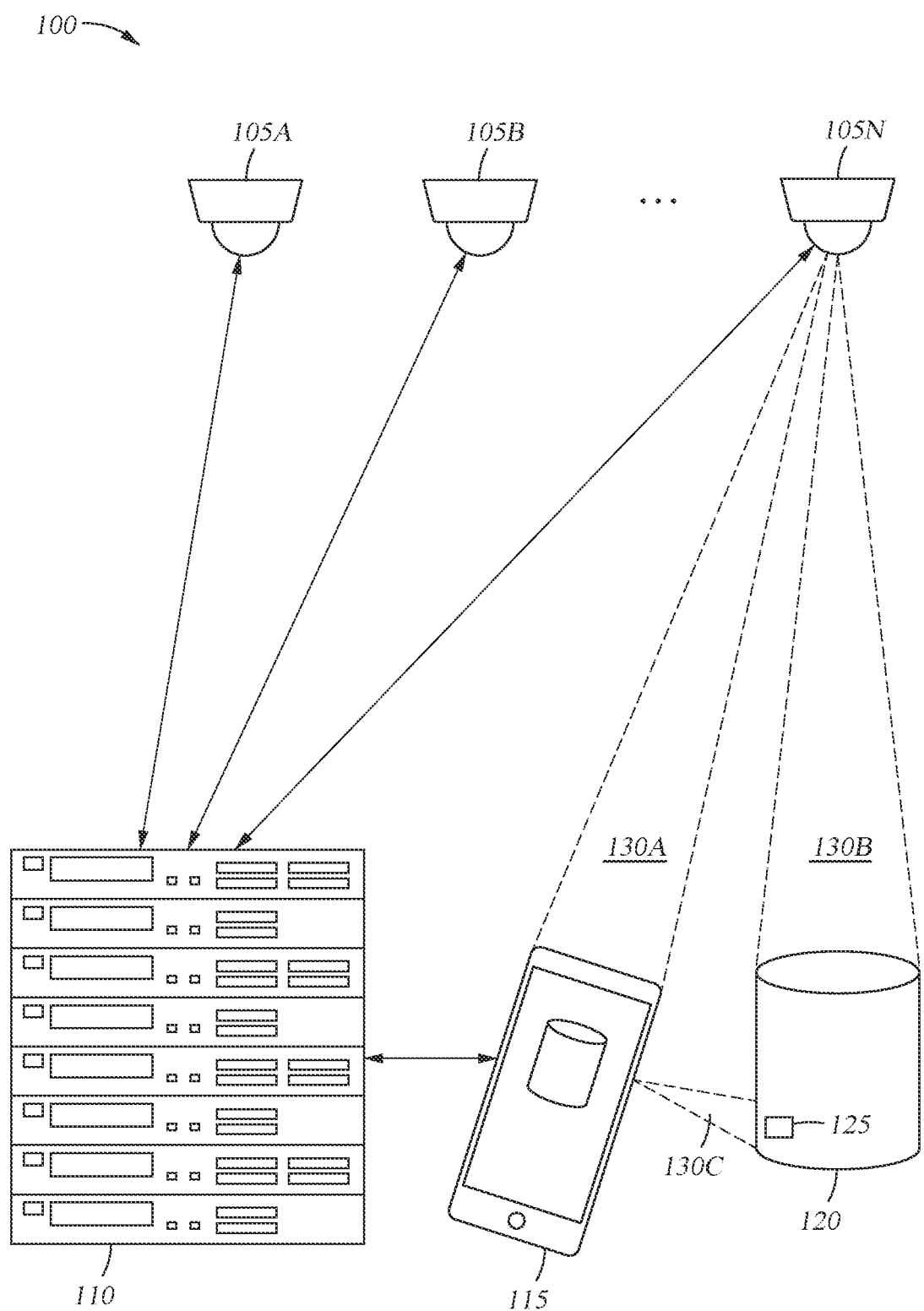
FIG. 1 illustrates an environment configured to automatically monitor transactions using symbol detection, according to one embodiment disclosed herein.

FIG. 1 illustrates an environment 100 configured to automatically monitor transactions using symbol detection, according to one embodiment disclosed herein. The environment 100 includes a set of Sensors 105A-N. In the illustrated embodiment, the Sensors 105 are cameras which capture still images and/or video data. In various embodiments, the Sensors 105 may include any number and variety of sensors, including microphones to detect audio data. In an embodiment, the Sensors 105 are positioned and configured to capture data from a physical environment (e.g., a retail space).

As illustrated, the Sensors 105 are communicatively coupled with an Audit Component 110. Although depicted as a physical device or server, in embodiments, the Audit Component 110 may be implemented using hardware, software, or a combination of hardware and software. In at least one embodiment, the Audit Component 110 is implemented as a cloud-based application.

In an embodiment, the Audit Component 110 can monitor transactions in the environment 100 based at least in part on data received from the Sensors 105. For example, the Sensors 105 may transmit sensor data collected in the environment (e.g., video, images, and/or audio captured in the space). The Audit Component 110 can evaluate some or all of this data to monitor the ongoing transactions. In some embodiments, the Sensors 105 can provide all of their captured data to the Audit Component 110.

In at least one embodiment, each Sensor 105 may only provide the collected data when one or more defined events occurs. For example, each time a symbol or cue is detected in the space, the Sensor 105 that detected the symbol can transmit the relevant contextual data (e.g., one or more images or videos captured before, during, and/or after the symbol detection). In some embodiments, the Sensors 105 can detect other events, such as a user placing an item into their receptacle. As above, the Sensor 105 may transmit the relevant images, video, audio, or other sensor data for each such occurrence.

In the illustrated embodiment, a User Device 115 can be used (e.g., by a retail customer) to complete a transaction. As illustrated, the user may use the User Device 115 to scan, capture image(s) of, or otherwise input Items 120 that they wish to purchase. For example, the User Device 115 may be used to scan a barcode or other visual encoding of the object (e.g., Barcode 125), to capture an image of the item. In at least one embodiment, the user may also manually enter the Item 120 into the system using the User Device 115. In the illustrated environment 100, the User Device 115 is scanning the Barcode 125 of the Item 120 (indicated by sightlines 130C).

In some embodiments, when a transaction is initiated (e.g., when the user signs in or enters the environment), the Audit Component 110 can assign a unique symbol to the User Device 115. This symbol may be a visual cue (e.g., an image, color, pattern, and the like), an auditory cue (e.g., a sound), and the like. Each time the user uses the User Device 115 to scan an object or otherwise input an item as part of the transaction, the User Device 115 can output the assigned symbol (e.g., flashing or displaying a visual cue). In some embodiments, the User Device 115 may also output an indication of the scanned item (e.g., an image of the item, the name of the item, and the like).

As illustrated, the User Device 115 is also communicatively coupled with the Audit Component 110. In an embodiment, each time the user scans or inputs an item, the User Device 115 can transmit a record or other indication of the scan to the Audit Component 110. The Audit Component 110 can then update the transaction record(s) associated with the user or User Device 115 to indicate that the user has purchased (or plans to purchase) the corresponding Item 120.

In an embodiment, as the User Device 115 inputs items, the Sensors 105 may detect the output symbol from the User Device 115. In the illustrated embodiment, the Sensor 105N detects a visual symbol output by the User Device 115 (indicated by sightlines 130A). In one embodiment, upon detecting the symbol, the Sensor 105 can transmit data associated with this detection to the Audit Component 110. This data may include, for example, an indication of the symbol that was identified, a timestamp for the detection, a location or identity of the Sensor 105, and the like. In some embodiments, the Sensor 105 also provides data collected at the time (or within a window of time surrounding the timestamp), such as images or video collected just before or after the scan.

As illustrated by sightlines 130B, in some embodiments, the Sensor 105 can also collect data about the Item 120. For example, the Sensor 105 may detect the item (e.g., using object detection or localization), identify the item (using image recognition), identify actions of the user (e.g., placing the item back on the shelf, in a cart, and the like) or perform other related tasks. In some embodiments, this data is also included in the transmission to the Audit Component 110.

As discussed above, as the symbol is unique to each active transaction associated with the User Device 115, the Audit Component 110 can associate the collected sensor data with the transaction. Further, based on timestamps associated with the sensor data and the transaction records provided by the User Device 115, the Audit Component 110 may correlate the data to identify which images or videos correspond to each particular scan record.

In embodiments, the Audit Component 110 can use this correlated data to evaluate the ongoing transaction. In one embodiment, the evaluation is performed in real time (e.g., each time the symbol is detected by the Sensors 105, each time a scan record is received from the User Device 115, and the like). In some embodiments, the evaluation is performed when the transaction is closed (e.g., at the time of check out).

In various embodiments, the evaluation of the transaction can include a wide variety of actions. In one embodiment, at checkout, the Audit Component 110 can determine how many times the symbol was detected, as well as how many scan records were received from the User Device 115. In some embodiments, if the values differ beyond a threshold, the Audit Component 110 can initiate an audit of the transaction or otherwise update an audit score.

In at least one embodiment, at checkout, the Audit Component 110 can evaluate one or more images of the user's receptacle in order to determine the number of items the user is taking. For example, the user may initiate check out (e.g., as the user leaves the environment). In response, the User Device 115 may output the assigned symbol. Upon detecting the symbol, as above, the Sensor(s) 105 may transit one or more images or videos of the user's receptacle at the time of check out. In some embodiments, the Audit Component 110 can evaluate these images to determine how many items are in the receptacle. This count of items can then be compared to the number of times the symbol was detected, the number of scan records received, and the like.

In some embodiments, the evaluation of the transaction may include analysis of the user's movements in the environment. For example, the Audit Component 110 may evaluate the sensor data related to each detected symbol to determine whether the user also placed an item into their basket or cart at that time. In one such embodiment, the Audit Component 110 can update the transaction record or audit score based on whether or not such an addition was detected. In some embodiments, the Audit Component 110 can determine the elapsed time between the scan and the placement of the item in the receptacle. The audit score may be based in part on this elapsed time.

In a related embodiment, the Audit Component 110 can similarly determine the number of times the user appeared to place items into the basket, and compare this count to the number of scan records received, the number of times the symbol was detected, the number of items detected at checkout, and the like. If any of these values differ beyond a threshold, the audit score may be adjusted.

In some embodiments, in addition to counting the number of scans, symbols, and/or items, the Audit Component 110 can also perform more complex image analysis on the captured images. In one such embodiment, the Audit Component 110 can perform image or object recognition to detect what item is being placed into the user's cart.

For example, when a scan record is received from the User Device 115, the Audit Component 110 can identify the corresponding image(s) based on the detected symbol that was output when the scan was performed. By analyzing these image(s) to detect the object(s) being held by the user, the Audit Component 110 can determine whether the scan matches the item(s).

In some embodiments, this comparison does not require a precise or exact identification. For example, if the scan record indicates that the user is purchasing a can of vegetables, the Audit Component 110 may determine whether the user is holding a can in the image(s). If so, the Audit Component 110 may determine that the record is valid or verified. That is, even if the Audit Component 110 cannot conclusively determine whether the user is actually holding the correct can (e.g., to ensure the user did not scan a less expensive can of food while taking a more expensive one), the Audit Component 110 can determine that the record is sufficiently accurate. In contrast, if the user is clearly holding some object other than a can, the Audit Component 110 can determine that the record is invalid or unverified. In response, the Audit Component 110 may update the audit score.

Further, in at least one embodiment, if the Audit Component 110 determines that no object can be recognized in the image(s) captured at the time of the scan, the Audit Component 110 can process one or more other images (e.g., for the next time the symbol is detected) to determine whether the user's cart or basket includes a new item corresponding to the previous scan. Based on this analysis, the audit score can be updated.

In embodiments, based on such evaluations, the Audit Component 110 can generate an audit score for the transaction. For example, in one embodiment, a larger difference between each type of count can correspond to a larger audit score. Similarly, a larger length of time between the user placing an object in the cart and the scan being received may correspond to a larger audit score. In some embodiments, if the audit score exceeds one or more thresholds, one or more audit actions can be initiated. This may include, for example, flagging the transaction for review, flagging the user or User Device 115 for review, dispatching an employee to assist the user and verify the transaction, and the like. In some embodiments, in addition to dispatching an employee, the system can provide information related to the suspicion (e.g., indicating the item(s) that were detected, the item(s) that were actually scanned, and the like) to aid the investigation.

Figure 2A:
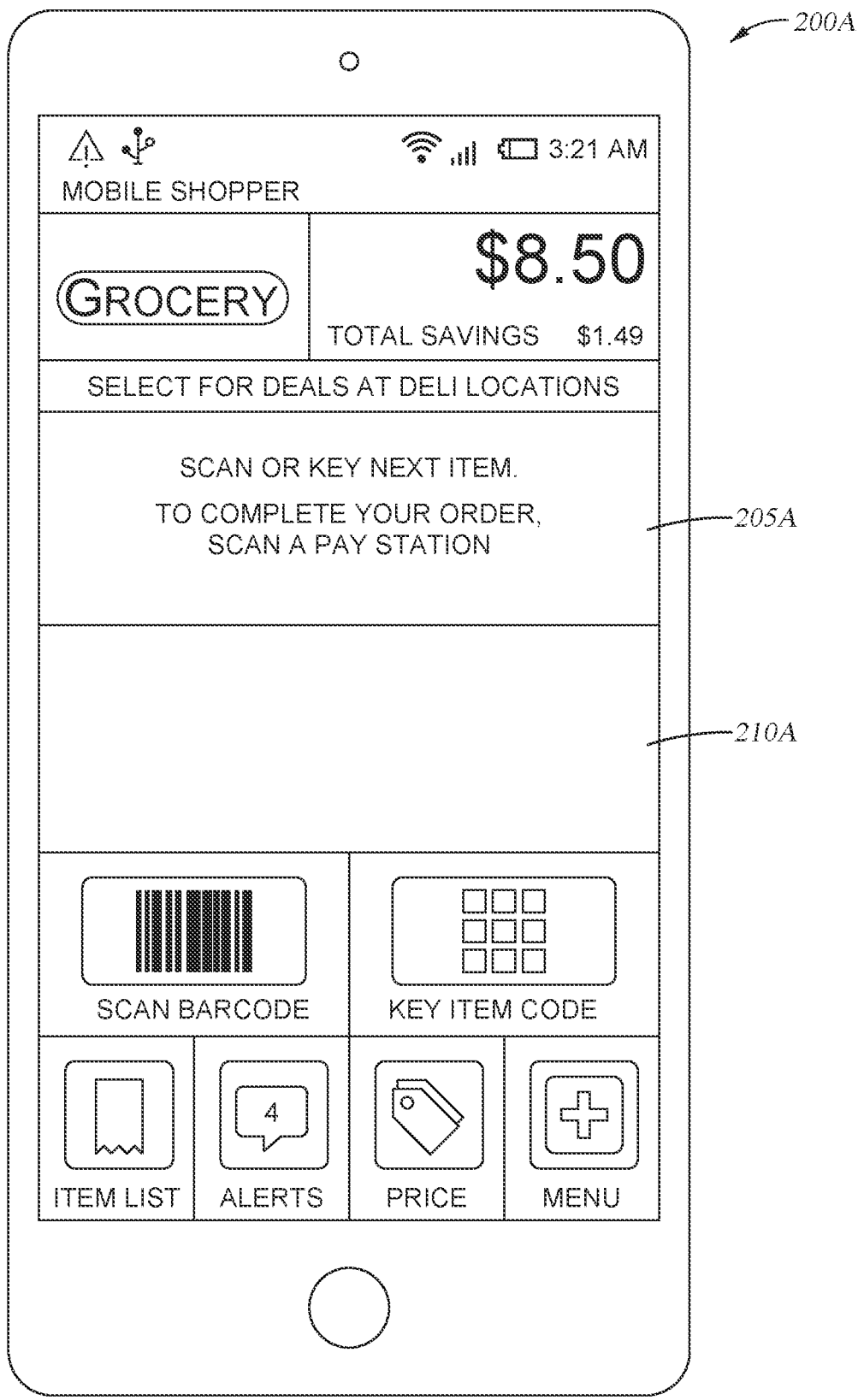
FIGS. 2A and 2B depict a user device outputting a transaction symbol, according to one embodiment disclosed herein.
Figure 2B:
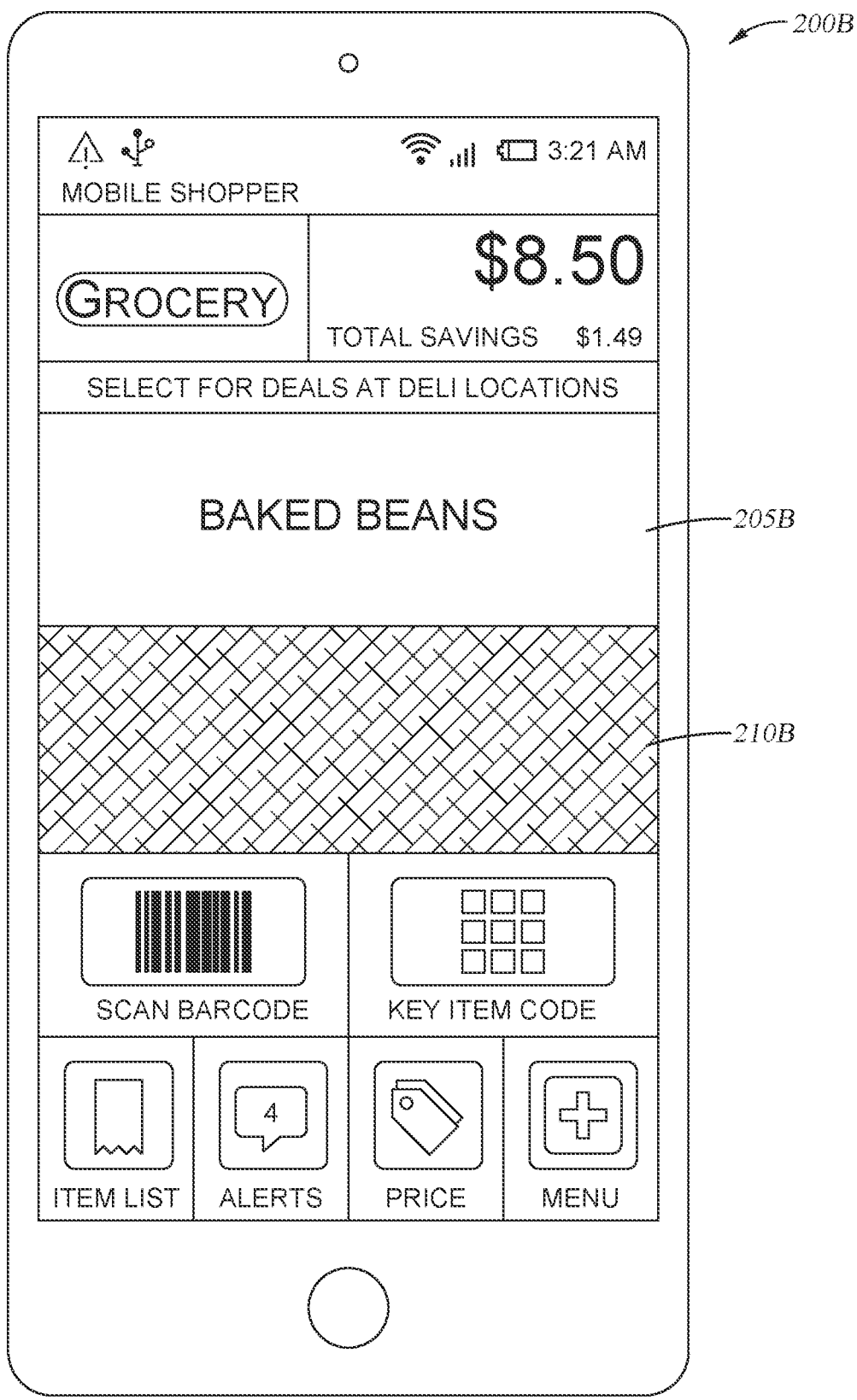

FIGS. 2A and 2B depict a user device outputting a transaction symbol, according to one embodiment disclosed herein. In the illustrated embodiment of FIG. 2A, at a first time indicated by 200A, the user device is outputting a graphical user interface (GUI) to facilitate the transaction. That is, the user device may execute an application that facilitates the transaction.

In the illustrated embodiment, the GUI includes various information such as the running total cost for the transaction, options to view promotions, and the like. As illustrated, the GUI may also include one or more buttons or other inputs to perform actions such as scanning a barcode, manually entering a code, checking the price of an item (e.g., scanning it without adding it to the transaction), and the like. In an embodiment, when no item is being scanned, a first portion of the screen (indicated by 205A) may provide instructions (e.g., "scan or enter an item" or "scan a checkout station to complete the order"), while a second area (indicated by 210A) is blank.

As illustrated by 200B in FIG. 2B, when the user scans or otherwise enters an item, the GUI is updated to reflect the scan. For example, in the area 210B, the GUI may output the assigned symbol (e.g., a unique pattern, color, or combination of color and pattern) on the device. Similarly, in some embodiments, the GUI may also output an indication of the item (e.g., the name of the item, a picture of the item, and the like) in another section (e.g., in the area 205B). In embodiments, as discussed above, one or more sensors in the environment may detect the output symbol. Although illustrated as being output in a single area 210B, in embodiments, the symbol output may take any form. For example, a pattern may be output across the entire background of the GUI. In embodiments, the symbol may include any number and variety of elements, including visual patterns (e.g., cross hatches, dots, vertical or horizontal lines), shapes (e.g., star shapes), colors, sounds, and the like.

Figure 3:
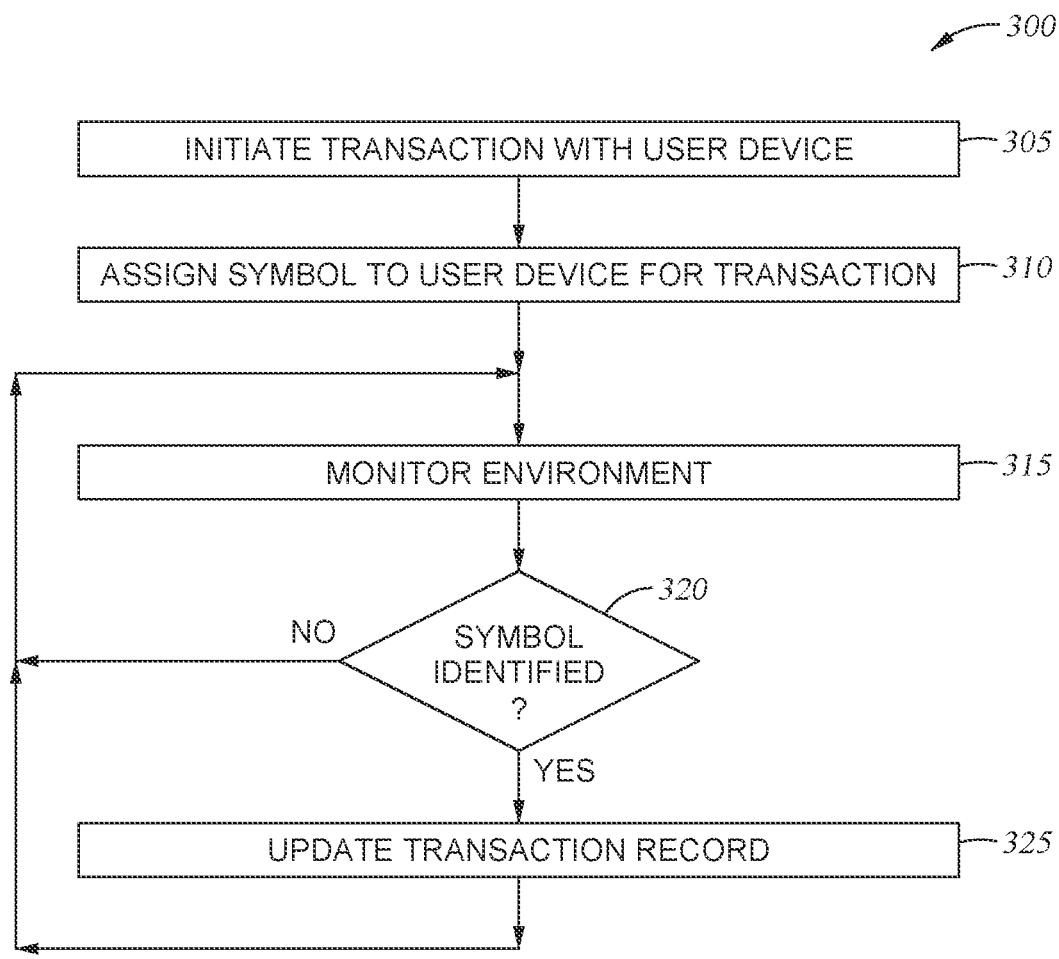
FIG. 3 is a flow diagram illustrating a method for monitoring user transactions using unique symbols, according to one embodiment disclosed herein.

FIG. 3 is a flow diagram illustrating a method 300 for monitoring user transactions using unique symbols, according to one embodiment disclosed herein. The method 300 begins at block 305, where an audit system (e.g., Audit Component 110) initiates a transaction with a user device. In embodiments, the transaction initiation may take any number of forms.

For example, in one embodiment, the user can, via the user device, begin a transaction (e.g., by selecting a button or option to initiate the shopping transaction). In some embodiments, the transaction is initiated automatically when the user enters the environment (e.g., when the audit system detects the presence of the user device), or when the user scans or enters the first item of the transaction.

At block 310, the audit system assigns a symbol to the user device for the initiated transaction. In an embodiment, this symbol is unique to the transaction in that it is not shared by any other ongoing transactions. In some embodiments, the symbols may be reused for transactions that do not overlap. That is, the audit system may assign the same symbol to different transactions that occur at different times.

In one such embodiment, therefore, the audit system can generate or select a symbol (or combination of symbols), confirm it is not in use for an ongoing transaction, and assign it to the user device. In a related embodiment, the audit system may generate or select the symbol from a set of currently-unused symbols.

In some embodiments, the audit system may assign the symbol to a set of user devices. In some embodiments, the initiating user device may indicate other user device(s) that are part of the transaction. For example, individual users that are part of the same shopping trip or family may all be associated with the transaction or a group user account. In such an embodiment, the audit system may assign the same symbol to each such device. In another embodiment, the initiating user device may share the assigned symbol with the associated user devices. In this way, multiple users can each input items as part of the same transaction, even if the users use discrete devices and are in different parts of the environment at the same time.

The method 300 then continues to block 315, where the audit system monitors the physical environment. For example, cameras or other sensor devices in the environment may monitor sensor data (e.g., images) to detect the presence of the assigned symbol(s). In an embodiment, the audit system may monitor for any number of symbols simultaneously. That is, although the illustrated embodiment implies a single symbol and transaction for conceptual clarity, in embodiments, the method 300 may be performed in parallel for any number of symbols and transactions. This allows the audit system to facilitate a number of overlapping transactions.

At block 320, the audit system determines whether an assigned symbol has been detected in the environment. If not, the method 300 returns to block 315 and the audit system continues to monitor the environment.

If, at block 320, the audit system determines that a symbol has been detected, the method 300 continues to block 325. At block 325, the audit system identifies the corresponding transaction for the detected symbol, and updates the identified transaction record. For example, the audit system may determine which transaction, user(s), and/or user device(s) have been assigned the detected symbol. The audit system can then update the corresponding transactions based on the detection of the symbol.

This update may include, for example, incrementing a count of the number of times the symbol was detected, indicating a location and/or timestamp of the detection, including data generated by evaluating the detection (e.g., what type of object the user was holding near the time of the detection, whether the user placed an item into their cart, and the like). In some embodiments, the audit system can also identify the corresponding scan record (received from the user device), and correlate the symbol detection to the scan record. This can allow the audit system to evaluate the transaction on a more granular basis. The method 300 can then return to block 315 to continue monitoring the environment.

In some embodiments, the audit system can evaluate each symbol detection, scan record, and/or user movement as they occur. In some embodiments, the audit system can process this data when the transaction is completed or closed by the user. For example, as discussed above, the audit system may compare the number of scan records, the number of symbols detected, the number of items in the cart, and the like. Further, the audit system may compare the item being held by the user (e.g., detected in captured images) and the item that was actually scanned.

Figure 4:
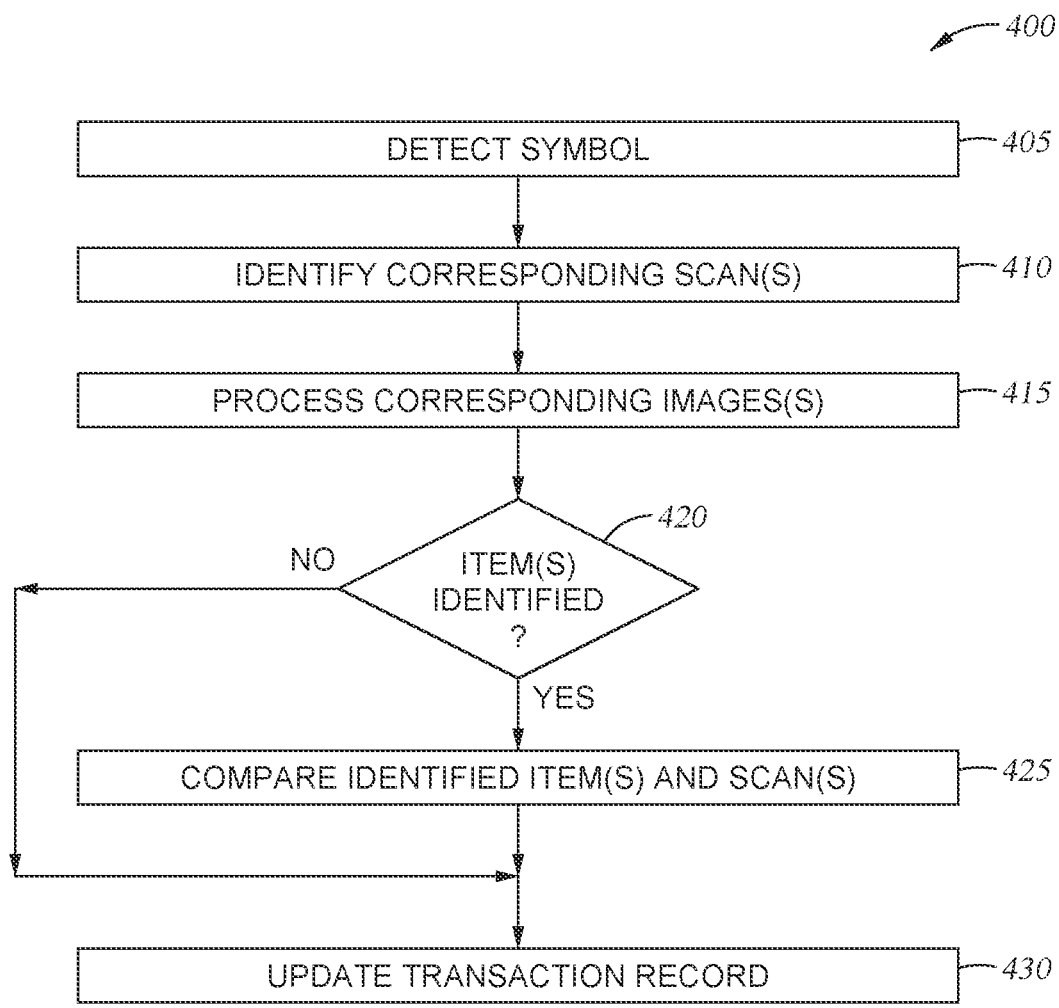
FIG. 4 is a flow diagram illustrating a method for evaluating image data based on detected symbols to enhance monitoring of user transactions, according to one embodiment disclosed herein.

FIG. 4 is a flow diagram illustrating a method 400 for evaluating image data based on detected symbols to enhance monitoring of user transactions, according to one embodiment disclosed herein. Specifically, the method 400 depicts techniques to compare scan records to the actual item(s) being held by the user, in order to update transaction records and audit scores.

The method 400 begins at block 405, where an audit system detects a symbol being output in a retail environment. For example, as discussed above, the audit system may detect a visual symbol output by a user's personal device. At block 410, the audit system can identify the scan(s) that correspond to the detected symbol.

In one embodiment, the audit system does so by first identifying the transaction assigned to the detected symbol. The audit system may then determine whether any scan record(s) were received for the identified transaction. This may include, for example, identifying the scan record(s) that occurred at the same time (or within a predefined time) as the time the symbol was detected.

The method 400 then proceeds to block 415, where the audit system processes the corresponding image(s) (or other sensor data) associated with the symbol detection. For example, as discussed above, the audit system may retrieve one or more images or videos that cover the relevant location at the relevant time. This may include retrieving images from the camera that detected the symbol, as well as retrieving images from one or more other cameras that cover the same area (e.g., the same section of the environment).

In one embodiment, processing the image(s) includes performing object detection and/or identification on the image(s). For example, the audit system may use one or more machine learning models (e.g., trained neural networks) to identify or classify items.

At block 420, the audit system determines whether one or more item(s) were identified in the image(s). In at least one embodiment, the audit system determines whether any item(s) were detected in the hand(s) of the user. For example, based on the detected symbol (e.g., based on the device outputting the symbol), the audit system may identify the individual that is performing the scan (e.g., because the individual is holding the device outputting the symbol). The audit system may then determine whether the user is also holding another item, is scanning an item on the shelf or in the cart, and the like.

If no items are identified (e.g., because the item is obscured or simply cannot be identified), the method 400 proceeds to block 430 where the audit system updates the transaction record for the ongoing transaction. This may include, for example, adding an indication that the scan could not be verified because no corresponding item was identified. In some embodiments, the audit system may also update the audit score associated with the transaction (e.g., by incrementing it) based on this failure.

If, at block 420, the audit system determines that one or more items were identified, the method 400 continues to block 425. At block 425, the audit system compares the identified item(s) with the corresponding scan record(s). In some embodiments, the audit system determines whether the identified item matches the item indicated in the scan record. In at least one embodiment, the audit system uses fuzzy-match techniques, such as by determining whether the identified item is within the same class or type as the scanned item. For example, if the scan indicates that a can of vegetables was input, the audit system may determine whether the identified item is a can.

The method 400 then continues to block 430, where the audit system updates the transaction record based on the comparison. This may include, for example, adding an indication that the scan was verified (if the comparison confirmed that the identified item matches the scanned item), an indication that the scan was not verified (if the identified item does not match the scanned item), and the like.

In at least one embodiment, in addition to identifying the item(s) being scanned, the audit system can also evaluate one or more images before and/or after the scan to determine whether other item(s) were added to the user's cart. For example, the user may place an item in the cart while scanning an item on the shelf, or may pick up an item to scan after placing a different item in the cart. Similarly, the user may scan an item, return it to the shelf, and place a different item in the cart. In some embodiments, the comparison and evaluation at block 425 includes such analysis.

Figure 5:
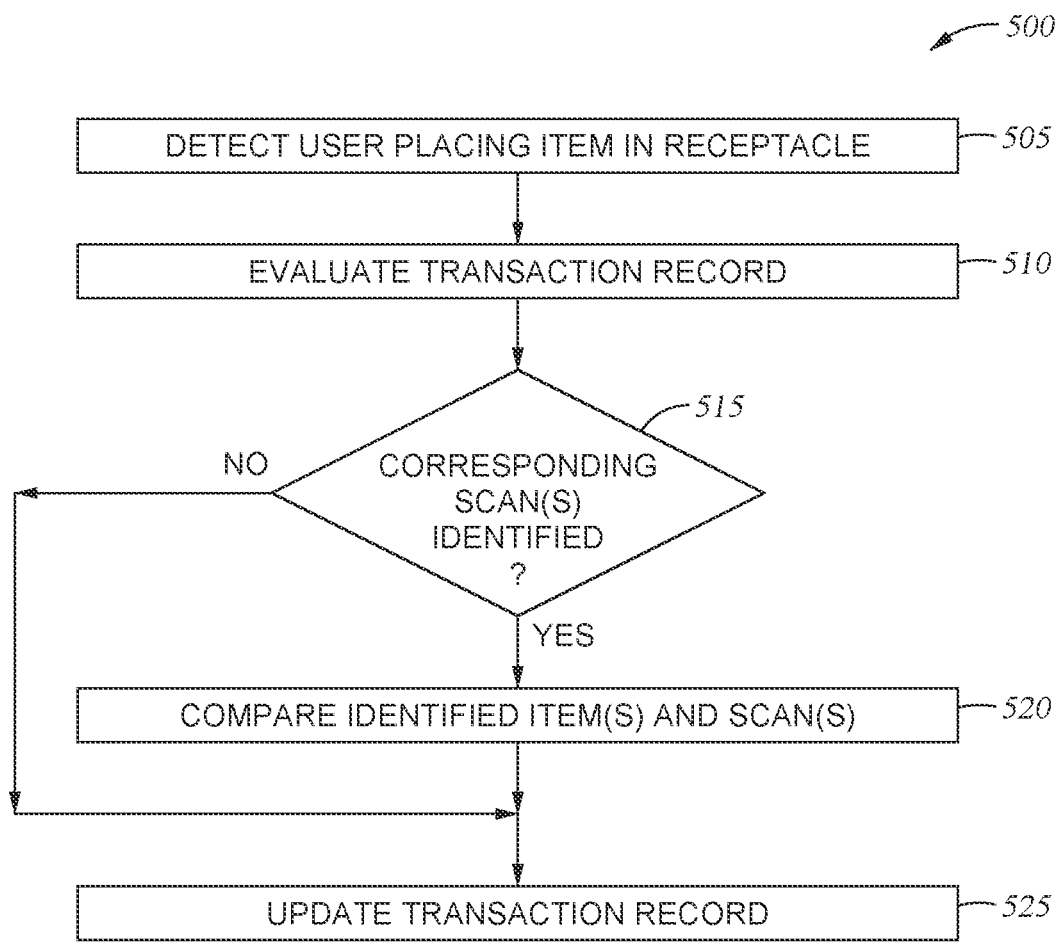
FIG. 5 is a flow diagram illustrating a method for evaluating image data based and symbol detection data to monitor user transactions, according to one embodiment disclosed herein.

FIG. 5 is a flow diagram illustrating a method 500 for evaluating image data based and symbol detection data to monitor user transactions, according to one embodiment disclosed herein. In one embodiment, the method 500 describes techniques to compare scan records and detected user movements. That is, for each time the audit system determines that a user added an item to the cart, the audit system can compare this addition to the received set of scan records from the user device.

At block 505, the audit system detects a user placing an item into their receptacle (e.g., their cart, basket, bag, or other receptacle). For example, as discussed above, the audit system may evaluate images captured in the environment to identify item(s) being placed into receptacle(s). Each time such a movement is detected, in one embodiment, the audit system may evaluate the transaction(s).

At block 510, the audit system evaluates the transaction record(s) to determine whether a scan corresponding to the detected movement has been received. That is, the audit system can determine whether any symbol was detected in the area and at the time of the movement, whether any scans were received around the time of the movement, and the like.

At block 515, the audit system determines whether any such scans were identified. If not (e.g., if the user placed the item in the cart but did not scan any items within a period of time before or after the placement), the method 500 continues to block 525, where the audit system updates the transaction record. As discussed above, this may include indicating that the item is not verified, indicating that an item was added without being scanned, and the like. This may also involve updating the audit score for the transaction.

If, at block 515, the audit system determines that there is a corresponding scan for the item placement, the method 500 continues to block 520. At block 520, the audit system compares the identified scan with the identified items. As above, this may include determining whether the placed item is within the same class, category, or type as the scanned item. The method 500 then continues to block 525, where the audit system updates the transaction record to reflect this comparison, as discussed above.

Figure 6:
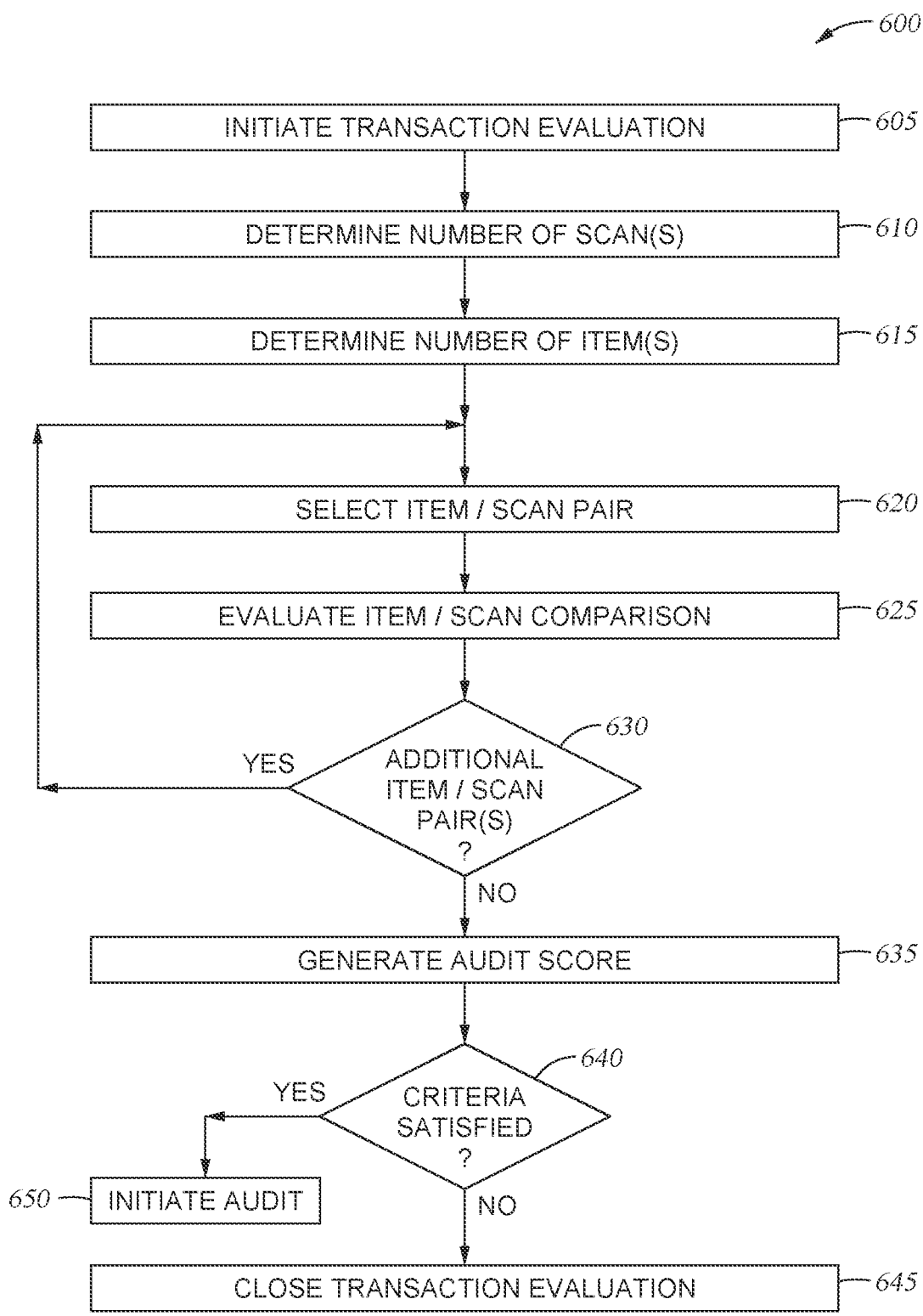
FIG. 6 is a flow diagram illustrating a method for user transactions based on transaction records and detected symbols, according to one embodiment disclosed herein.

FIG. 6 is a flow diagram illustrating a method 600 for user transactions based on transaction records and detected symbols, according to one embodiment disclosed herein. In some embodiments, the method 600 is performed each time a predefined event occurs (e.g., each time a scan is received by the audit system, each time a symbol is detected in the environment, each time the user places an item in the cart, and the like). In at least one embodiment, the method 600 is performed when the transaction is closed or completed (e.g., when the user scans a designated code indicating they are finished, when the user leaves the area, and the like).

The method 600 beings at block 605, where the audit system initiates a transaction evaluation. As above, this may be based on the occurrence of one or more specified events (e.g., item scanning, transaction completion, and the like). At block 610, the audit system can determine the number of scan(s) that were identified for the transaction. This may include, for example, determining the number of scan records received from the user device, determining the number of times the symbol was identified in the space, and the like.

At block 615, the audit system determines the number of items present in the cart or other user receptacle. For example, the audit system may evaluate one or more images of the receptacle to determine the number of items present.

The method 600 then proceeds to block 620, where the audit system selects one item/scan pair from the transaction. As discussed above, in some embodiments, the audit system can correlate scan records and identified items based on the time when the scan was performed, and when/where the symbol was detected. For example, the audit system may retrieve the corresponding images for the time and location, and evaluate these images to determine which item was being handled.

At block 625, the audit system evaluates the item/scan comparisons discussed above. For example, the audit system may determine whether the item is within the same category as the category indicated by the scan. In some embodiments, evaluating this comparison also includes determining the elapsed time between scanning the item and placing it in the cart (or between placing it in the cart and scanning the item).

The method 600 then continues to block 630, where the audit system determines whether there is at least one additional pair to be evaluated (e.g., at least one more scan or at least one more item that has not yet been evaluated). If so, the method 600 returns to block 620.

If all of the scan(s) and/or item(s) in the transaction have been evaluated, the method 600 continues to block 635, where the audit system generates an audit score for the transaction. In some embodiments, as discussed above, this audit score is based at least in part on how closely the number of scans, the number of symbols detected, and/or the number of items found in the cart align.

In some embodiments, the audit score is also or alternatively based on how close each item/scan comparison is. For example, whether any item(s) are found without corresponding scans, whether any scan(s) are found without corresponding items, and the like. Similarly, the audit score may be based on whether the item(s) are within the same category as the scan, and the like.

At block 640, the audit system determines whether the audit score satisfies one or more defined criteria. For example, the audit system may determine whether the audit score meets or exceeds some defined threshold(s). If the audit system does not exceed such criteria, the method 600 continues to block 645, where the audit system closes the transaction. That is, the transaction completes and the user leaves with the items.

If, at block 640, the audit system determines that one or more of the criteria are met, the method 600 continues to block 650, where the audit system initiates a more in-depth audit. In some embodiments, the particular actions taken may differ depending on the audit score (e.g., depending on which threshold(s) were exceeded). For example, exceeding a first threshold may cause the audit system to flag the user account for future suspicion (e.g., such that patterns of over or under scanning can be identified), while a second threshold may cause the audit system to cancel or close the user's account.

In some embodiments, the audit includes dispatching an employee to verify the transaction. This may include, for example, confirming whether the user scanned each item in the cart, checking whether the user mistakenly scanned any items without adding them to the cart, and the like. In at least one embodiment, the audit system can also provide information related to the concern. For example, the audit system may indicate that the user scanned a can of vegetables but appeared to add a steak to the cart.

Figure 7:
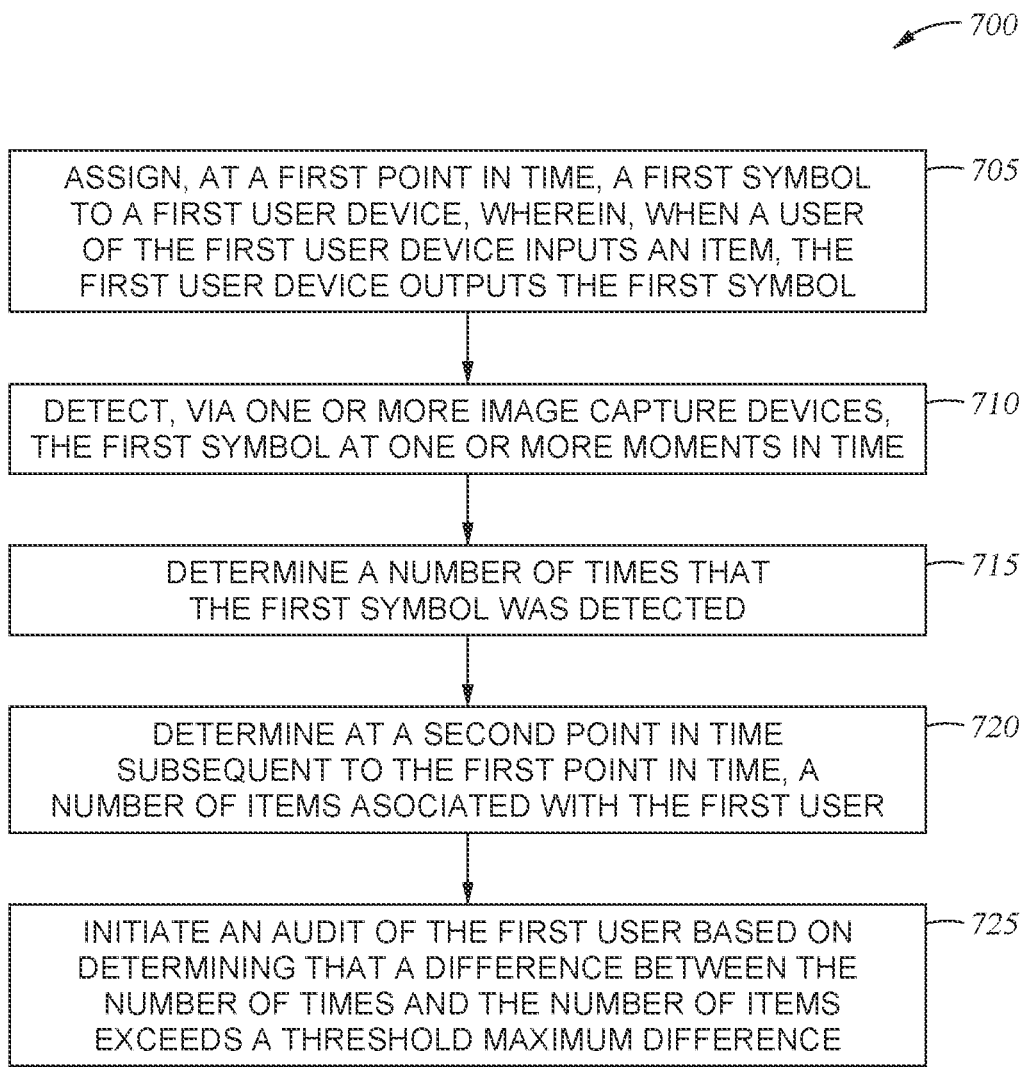
FIG. 7 is a flow diagram illustrating a method for automatically monitoring and auditing transactions based on unique user symbols, according to one embodiment disclosed herein.

FIG. 7 is a flow diagram illustrating a method 700 for automatically monitoring and auditing transactions based on unique user symbols, according to one embodiment disclosed herein. The method 700 begins at block 705, where an audit system assigns, at a first point in time, a first symbol to a first user device, wherein, when a user of the first user device inputs an item, the first user device outputs the first symbol.

At block 710, the audit system detects, via one or more image capture devices, the first symbol at one or more moments in time. Further, at block 715, the audit system determines a number of times that the first symbol was detected.

The method 700 then proceeds to block 720, where the audit system determines at a second point in time subsequent to the first point in time, a number of items associated with the first user.

At block 725, the audit system initiates an audit of the first user based on determining that a difference between the number of times and the number of items exceeds a threshold maximum difference.

Figure 8:
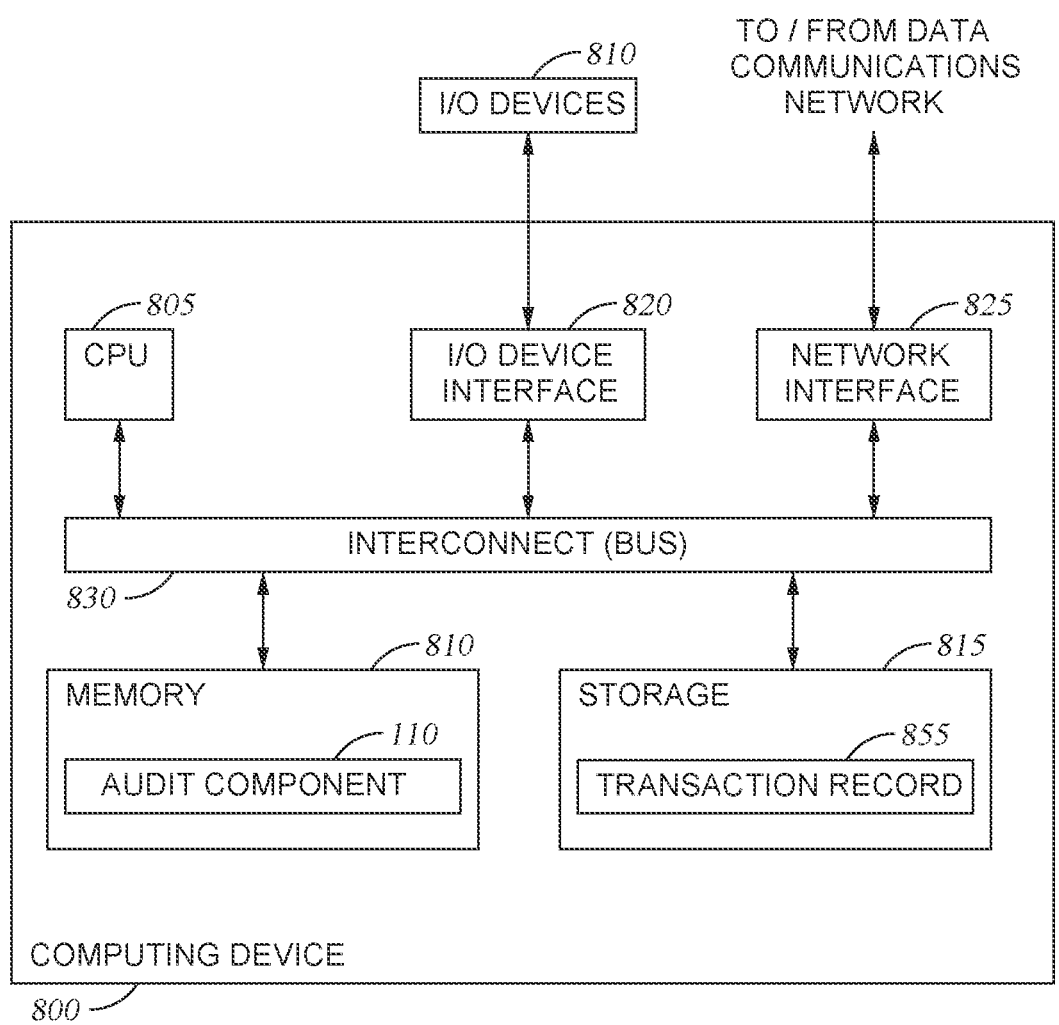
FIG. 8 is a block diagram depicting a computing device configured to automatically monitor transactions, according to one embodiment disclosed herein.

FIG. 8 is a block diagram depicting a Computing Device 800 configured to automatically monitor transactions, according to one embodiment disclosed herein. Although depicted as a physical device, in embodiments, the Computing Device 800 may be implemented using virtual device(s), and/or across a number of devices (e.g., in a cloud environment). As illustrated, the Computing Device 800 includes a CPU 805, Memory 810, Storage 815, a Network Interface 825, and one or more I/O Interfaces 820. In the illustrated embodiment, the CPU 805 retrieves and executes programming instructions stored in Memory 810, as well as stores and retrieves application data residing in Storage 815. The CPU 805 is generally representative of a single CPU and/or GPU, multiple CPUs and/or GPUs, a single CPU and/or GPU having multiple processing cores, and the like. The Memory 810 is generally included to be representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O Devices 835 (such as keyboards, monitors, etc.) are connected via the I/O Interface(s) 820. Further, via the Network Interface 825, the Computing Device 800 can be communicatively coupled with one or more other devices and components (e.g., via a network, which may include the Internet, local network(s), and the like). As illustrated, the CPU 805, Memory 810, Storage 815, Network Interface(s) 825, and I/O Interface(s) 820 are communicatively coupled by one or more Buses 830.

In the illustrated embodiment, the Storage 815 includes a set of one or more Transaction Records 855. Although depicted as residing in Storage 815, in embodiments, the Transaction Records 855 may reside in any suitable location. In an embodiment, each Transaction Record 855 includes data relating to a corresponding transaction, such as the assigned symbol, the scan(s) received, the item(s) identified, the user device(s) participating, and the like. In some embodiments, the Transaction Records 855 can include ongoing transactions as well as completed transactions.

In the illustrated embodiment, the Memory 810 includes an Audit Component 110, which may be configured to perform one or more embodiments discussed above.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Image Evaluation Application 635) or related data available in the cloud. For example, the Image Evaluation Application 635 could execute on a computing system in the cloud and curate image data in order to train and maintain ML models. In such a case, the Image Evaluation Application 635 could label received images and store them at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
    assigning, by a computing system and at a first point in time, a symbol to a user device;
    causing, by the computing system, the user device to generate and output the symbol on a display of the user device in response to a user of the user device inputting an item;
    capturing, by the computing system, one or more images via one or more image capture devices at one or more moments in time;
    detecting, by the computing system, the symbol depicted in the one or more images;
    determining, by the computing system a number of times that the symbol was detected;
    determining, by the computing system and at a second point in time subsequent to the first point in time, a number of items in a receptacle associated with the user;
    determining that a difference between the number of times and the number of items exceeds a threshold maximum difference; and
    initiating, by the computing system, an audit of the user based at least in part on determining that the difference between the number of times and the number of items exceeds the threshold maximum difference.

2. The method of claim 1, wherein:
    the number of times is greater than the number of items; and
    the audit is initiated at least in part to determine whether the user input one or more items using the user device without adding the one or more items to the receptacle.

3. The method of claim 1, wherein:
    the number of times is less than the number of items; and
    the audit is initiated at least in part to determine whether the user added one or more items to the receptacle without inputting the one or more items using the user device.

4. The method of claim 1, wherein the symbol comprises a specific color and a specific pattern.

5. The method of claim 1, the method further comprising:
    upon detecting the symbol in a first image captured at a first moment in time, processing the first image to identify one or more items depicted in the first image;
    determining an item input by the user, using the user device, at the first moment in time; and
    comparing the item input by the user and the identified one or more items depicted in the first image, wherein initiating the audit is performed based at least in part on the comparison.

6. The method of claim 5, the method further comprising:
    upon detecting the symbol at a first moment in time, retrieving one or more images captured within a window of time from the first moment in time; and
    evaluating the one or more images to determine whether the user placed an item into the receptacle during the window of time.

7. The method of claim 6, wherein initiating the audit is performed based at least in part on determining that the user did not place an item into the receptacle during the window of time.

8. The method of claim 1, the method further comprising:
    determining, based on analyzing one or more images, that the user added an item to the receptacle at a first moment in time; and
    determining that the symbol was not detected within a window of time from the first moment in time, wherein initiating the audit is performed based at least in part on determining that the symbol was not detected within the window of time.

9. A computer-readable storage medium containing computer program code that, when executed by operation of one or more computer processors of a computing system, performs an operation comprising:
    assigning, at a first point in time, a symbol to a user device;
    causing, by the computing system, the user device to generate and output the symbol on a display of the user device in response to a user of the user device inputting an item;
    capturing, by the computing system, one or more images via one or more image capture devices at one or more moments in time;
    detecting, by the computing system, the symbol depicted in the one or more images;
    determining a number of times that the symbol was detected;
    determining at a second point in time subsequent to the first point in time, a number of items in a receptacle associated with the user; and
    determining that a difference between the number of times and the number of items exceeds a threshold maximum difference; and
    initiating, by the computing system, an audit of the user based at least in part on determining that the difference between the number of times and the number of items exceeds the threshold maximum difference.

10. The computer-readable storage medium of claim 9, wherein the symbol comprises a specific color and a specific pattern.

11. The computer-readable storage medium of claim 9, the operation further comprising:
    upon detecting the symbol in a first image captured at a first moment in time, processing the first image to identify one or more items depicted in the first image;
    determining an item input by the user, using the user device, at the first moment in time; and
    comparing the item input by the user and the identified one or more items depicted in the first image, wherein initiating the audit is performed based at least in part on the comparison.

12. The computer-readable storage medium of claim 11, the operation further comprising:
    upon detecting the symbol at a first moment in time, retrieving one or more images captured within a window of time from the first moment in time; and
    evaluating the one or more images to determine whether the user placed an item into the receptacle during the window of time.

13. The computer-readable storage medium of claim 12, wherein initiating the audit is performed based at least in part on determining that the user did not place an item into the receptacle during the window of time.

14. The computer-readable storage medium of claim 9, the operation further comprising:
   determining, based on analyzing one or more images, that the user added an item to the receptacle at a first moment in time; and
   determining that the symbol was not detected within a window of time from the first moment in time, wherein initiating the audit is performed based at least in part on determining that the symbol was not detected within the window of time.

15. A system comprising:
   one or more computer processors of a computing system; and
   a memory containing a program which when executed by the one or more computer processors performs an operation, the operation comprising:
      assigning, at a first point in time, a symbol to a user device;
      causing, by the computing system, the user device to generate and output the symbol on a display of the user device in response to a user of the user device inputting an item;
      capturing, by the computing system, one or more images via one or more image capture devices at one or more moments in time;
      detecting, by the computing system, the symbol depicted in the one or more images;
      determining a number of times that the symbol was detected;
      determining at a second point in time subsequent to the first point in time, a number of items in a receptacle associated with the user; and
      determining that a difference between the number of times and the number of items exceeds a threshold maximum difference; and
      initiating, by the computing system, an audit of the user based at least in part on determining that the difference between the number of times and the number of items exceeds the threshold maximum difference.

16. The system of claim 15, wherein the symbol comprises a specific color and a specific pattern.

17. The system of claim 15, the operation further comprising:
   upon detecting the symbol in a first image captured at a first moment in time, processing the first image to identify one or more items depicted in the first image;
   determining an item input by the user, using the user device, at the first moment in time; and
   comparing the item input by the user and the identified one or more items depicted in the first image, wherein initiating the audit is performed based at least in part on the comparison.

18. The system of claim 17, the operation further comprising:
   upon detecting the symbol at a first moment in time, retrieving one or more images captured within a window of time from the first moment in time; and
   evaluating the one or more images to determine whether the user placed an item into the receptacle during the window of time.

19. The system of claim 18, wherein initiating the audit is performed based at least in part on determining that the user did not place an item into the receptacle during the window of time.

20. The system of claim 15, the operation further comprising:
   determining, based on analyzing one or more images, that the user added an item to the receptacle at a first moment in time; and
   determining that the symbol was not detected within a window of time from the first moment in time, wherein initiating the audit is performed based at least in part on determining that the symbol was not detected within the window of time.

* * * * *